United States Patent [19]

Stefani et al.

[11] Patent Number: 5,340,845
[45] Date of Patent: Aug. 23, 1994

[54] PROCESS FOR PREPARING LOW-DENSITY FLEXIBLE POLYURETHANE FOAMS, AND THE POLYURETHANE FOAMS OBTAINED

[75] Inventors: Dario Stefani, Padova; Felix O. Sam, Venezia; Gianflavio Lunardon, Padova, all of Italy

[73] Assignee: Enichem, S.p.A., Milan, Italy

[21] Appl. No.: 95,723

[22] Filed: Jul. 21, 1993

[30] Foreign Application Priority Data

Jul. 23, 1992 [IT] Italy .................. MI.92-A/001782

[51] Int. Cl.$^5$ ........................ C08G 18/28; C08J 9/08
[52] U.S. Cl. .................................. 521/130; 521/172; 521/174
[58] Field of Search ................ 521/130, 172, 174

[56] References Cited

U.S. PATENT DOCUMENTS 5,140,052  8/1992  Franklin ................ 521/130

*Primary Examiner*—Morton Foelak
*Attorney, Agent, or Firm*—Rogers & Wells

[57] ABSTRACT

A process for preparing low-density flexible polyurethane foams obtained, in the absence of expanding agents of chlorofluoroalkane type, by the polycondensation of an organic polyisocyanate with at least one polyol of equivalent weight exceeding 50 and functionality equal to or greater than 2, in the presence of an expanding system comprising water and dimethyl carbonate (DMC).

9 Claims, No Drawings

PROCESS FOR PREPARING LOW-DENSITY FLEXIBLE POLYURETHANE FOAMS, AND THE POLYURETHANE FOAMS OBTAINED

This invention relates to a process for preparing low-density flexible polyurethane foams and the polyurethane foams obtained. More particularly, the invention relates to a process for preparing flexible polyurethane foams having a density of between 15 and 21 kg/m$^3$ and a loading capacity of between 50 and 150N at 40% compression in accordance with ISO 2439, the process not involving the use of secondary expanding agents of chlorofluoroalkane type.

Polyurethane foam production has been known for some time, consisting of reacting polyol-polyethers or polyesters with polyisocyanates in the presence of catalysts, expanding agents, cell regulator surfactants, stabilizers and other auxiliary substances.

Published European patent application No. 398,304 describes the preparation of flexible polyurethane foams by a process not requiring the use of chlorofluoroalkane expanding agents. Specifically, this latter patent application describes flexible polyurethane foams having a density of between 15 and 60 kg/m$^3$ and a loading capacity of between 50 and 150N at 40% compression in accordance with ISO 2439, using only carbon dioxide as the expanding agent.

According to this patent application, foams with the aforesaid characteristics can be obtained by reacting an aromatic or cycloaliphatic isocyanic prepolymer containing between 10 and 45 wt % of free NCO groups with a polyol polyether obtained by condensing propylene and ethylene oxide in which the ethylene oxide content is between 10 and 90 wt %.

Published European patent application No. 486,034 describes the possibility of increasing the loading capacity of the aforesaid flexible polyurethane foams to values exceeding 150N, again in the absence of secondary expanding agents of chlorofluoroalkane type, using as the polyurethane reagent a polyol polyether having an ethylene oxide content of less than 50 wt % and a well defined molecular weight.

Specifically, according to this latter patent application flexible polyurethane foams with a loading capacity exceeding 150N can be obtained in the absence of a chlorofluoroalkane expanding agent by reacting a modified polyisocyanate with a compound containing terminal active hydrogens, in which:

the modified polyisocyanate contains between 10 and 45 wt % of free NCO groups and is obtained by partial polymerization of an organic polyisocyanate having isocyanic functionality of at least 2, with at least one polyol polyether of molecular weight between 500 and 8000 and hydroxyl functionality of between 2 and 4;

the compound containing terminal active hydrogens comprises water and at least one polyol polyether obtained by condensing propylene oxide and ethylene oxide and with an ethylene oxide content of less than 50 wt %, and having:

a) a hydroxyl functionality of between 2 and 4;

b) an equivalent weight of between 500 and 2500 per terminal hydroxyl group;

with the proviso that when the polyol polyether of the compound containing terminal active hydrogens has an ethylene oxide content of between 0 and 10 wt % its equivalent weight is between 500 and 2500, whereas when its ethylene oxide content is between 10 and 50 wt % its equivalent weight is between 1000 and 1500.

However, in the practical application of these inventions and in particular when producing expanded products having a density of less than 21 kg/m$^3$ difficulties have been encountered in the use of only carbon dioxide originating from the isocyanate/H$_2$O reaction because of the appearance of thermo-oxidative degradation (scorching) of the foam, caused by the high exothermic level of the chemical reactions during production.

The present applicant has now found that the drawback of the known art can be overcome by using in combination with the carbon dioxide a secondary expanding agent in the form of an alkyl carbonate.

The present invention therefore provides a process for preparing flexible polyurethane foams of density less than 21 kg/m$^3$ in the presence of an expanding agent not of chlorofluoroalkane type, consisting of reacting:

a) an organic polyisocyanate with b) a polyol composition comprising:

i) at least one polyol having an equivalent weight of between 50 and 2000 and a nominal functionality of at least 2;

ii) water in a quantity equal to or greater than 3 parts per 100 parts of polyol i);

iii) dimethyl carbonate (DMC) in a DMC/water weight ratio of between 0.2 and 3.

The polyol composition also comprises other additives commonly used in the preparation of polyurethane foams, for example amine catalysts such as triethylenediamine, and/or metallic catalysts such as stannous octoate, cell regulators, thermo-oxidation stabilizers, pigments etc. Polyurethane polymerization details are given in the book "Saunders & Frisch—Polyurethanes, Chemistry and Technology", Interscience, New York, 1964.

According to the present invention the reaction between components a) and b) is conducted at ambient temperature, the equivalents ratio of the polyisocyanate a) to the polyol composition b) being between 0.8 and 1.2, and preferably between 0.95 and 1.15. Any organic polyisocyanate able to give polyurethane foams can be used in the process of the present invention, although aromatic polyisocyanates, cycloaliphatic polyisocyanates and corresponding alkyl-substituted derivatives are preferred.

In particular, low molecular weight diisocyanates of general formula (I) can be used:

$$\text{OCH—R—NCO} \qquad (I)$$

where R represents a C$_5$–C$_{25}$ cycloaliphatic or aromatic radical, possibly alkyl-substituted, such as meta and/or para-phenylenediisocyanate; 2,4-toluenediisocyanate either alone or in mixture with the 2,6-toluenediisocyanate isomer; 4,4'-diphenylmethanediisocyanate possibly in mixture with its 2,4' isomer; 4,4'-dicyclohexylmethanediisocyanate; 1-isocyanato-3-isocyanatomethyl-3,3,5-trimethylcyclohexane (isophorone diisocyanate); etc. Alternatively medium or high molecular weight polyisocyanates of various levels of condensation can be used, obtained by phosgenation of aniline-formaldehyde condensates.

These products consist of mixtures of polymethylenepolyphenylpolyisocyanates of general formula:

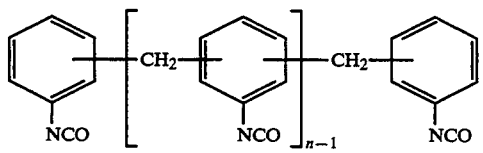

where n is a whole number greater than or equal to 1. Preferred medium or high molecular weight polyisocyanates are those polymethylenepolyphenylenepolyisocyanate mixtures with an average functionality of 2.6–2.8. Such products are marketed under various names, such as "Tedimon 31" of ECP-Enichem Polimeri, "Suprasec DNR" of ICI, and "Desmodur 44 V20" of Bayer.

The preferred polyisocyanate for the present invention is however 2,4-toluenediisocyanate either alone or in mixture with at least 20 wt % of its 2,6 isomer.

Undistilled or crude toluenediisocyanate, i.e. a partly purified toluenediisocyanate drawn from any plate of the distillation column, can be commonly used.

The polyol has an equivalent weight of between 50 and 2000 and a nominal functionality of at least 2, and preferably between 2 and 4. This reagent can be chosen from polyol polyethers, polyol polyethers containing ester groups, polyol polyethers containing terminal amino groups, polyol polyesters etc.

Preferred products are those polyol polyethers, possibly containing ester groups or terminal amino groups, obtained by condensing $C_2$-$C_6$ olefinic oxides on starter compounds comprising at least two active hydrogen atoms. Preferred olefinic oxides are ethylene oxide, propylene oxide or their mixtures containing ethylene oxide in a quantity less than 75 wt %, and preferably between 1 and 50 wt %.

The condensation is conducted on starters such as glycols, triols, tetrols etc., amines, alkanolamines and polyamines or their mixtures.

Representative examples of polyol polyethers for use in the present invention are those terminating with propylene oxide or with ethylene oxide and in which the starter is a glycol such as dipropyleneglycol; a triol such as glycerin; trimethylolpropane; 1,2,4-trihydroxybutane; 1,2,6-trihydroxyhexane; 1,1,1-trimethylolethane; a tetrol such as pentaerythritol; or a polyfunctional hydroxyalkane such as xylitol; arabitol; sorbitol; mannitol; etc.

These polyols can be used as such or can contain solid particles, preferably polymeric, of size less than 20 microns, either in dispersion or partly grafted onto the polyol chain. Polymers suitable for this purpose are: polyacrylonitrile; polystyrene; polyvinyl chloride etc., or their mixtures or copolymers; or urea-based polymers such as the "Polyharnstoff dispersionen" or "PHD polyolen" of Bayer. Said additives can be prepared by in situ polymerization in the polyol or can be prepared separately and added later to the polyol.

The polyols can be prepared by methods known to the expert of the art and described for example in the aforesaid "Saunders & Frisch—Polyurethanes, Chemistry and Technology".

In forming the polyurethane foams of the present invention, the quantity of water used in the polyol composition is critical in that the water generates the carbon dioxide which expands the polyurethane resin. A water quantity of between 3 and 6 parts by weight per 100 parts of polyol is most commonly used.

Hence, according to the present invention to expand the polyurethane resin carbon dioxide is preferably used as the primary agent, this being generated in situ by chemical reaction between water and the NCO groups of the organic polyisocyanate, DMC being used as the secondary agent. This method for introducing the primary expanding agent into the polymerization mass must not however be considered as limitative in that other gases and methods can be used, such as bubbling air, $CO_2$, nitrogen etc. into the reaction mass by injection from the outside, these all falling within the scope of the present invention.

The flexible polyurethane foams of the present invention have a density of between 15 and 21 $kg/m^3$ and a loading capacity greater than 50N and generally between 50 and 150N at 40% compression in accordance with ISO 2439, they being free from scorching and have satisfactory mechanical properties, such as compression set, bending fatigue and resilience, their characteristics hence being such that they satisfy the requirements of the furniture, furnishing, transport, motor and other industries which require foams with these properties, while not using chlorofluoroalkane expanding agents harmful to the environment.

The following examples are given to better illustrate the present invention without however representing a limitation thereto.

The quantities of the various formulation components are expressed as parts by weight unless otherwise stated.

EXAMPLES 1–8

Eight flexible expanded products A–H were prepared using the formulations summarized in the accompanying table. The table also shows the characteristics of each expanded product.

The foams were produced using an ADMIRAL V 100-6W6 plant provided with independent lines for each component. Before mixing with a mechanical stirrer at 3300 rpm, the various components were allowed to assume a temperature of 21° C.

The following components were used:

Polyol M.W. 4000: TERCAROL 856 of Enichem Polimeri;
Polyol M.W. 300: TERCAROL G 310 of Enichem Polimeri;
TDI 80/20: TEDIMON 80/20 of Enichem Polimeri;
Amino catalyst: NIAX A 1 of Union carbide, DABCO of Air Products;
Stabilizer: Silicone BF 2370 of Goldsmith;
CFC: Algofrene of Montefluos;
DMC: Produced by Enichem Synthesis.

| COMPOSITION AND PROPERTIES OF EXPANDED PRODUCTS | | | | | | | | |
|---|---|---|---|---|---|---|---|---|
| | A | B | C | D | E | F | G | H |
| POLYOL MW 4000 | 98.5 | 98.5 | 98.5 | 100 | 100 | 100 | 100 | 100 |
| POLYOL MW 300 | 1.5 | 1.5 | 1.5 | — | — | — | — | — |
| TDI 80/20 | 54 | 57.8 | 59.2 | 53.7 | 57.5 | 53.7 | 57.5 | 59 |
| WATER | 4.4 | 4.8 | 5.0 | 4.4 | 4.8 | 4.4 | 4.8 | 5.0 |

| COMPOSITION AND PROPERTIES OF EXPANDED PRODUCTS | | | | | | | | |
| --- | --- | --- | --- | --- | --- | --- | --- | --- |
|  | A | B | C | D | E | F | G | H |
| AMINE CATALYST NIAX AI + DABCO | 0.1/0.12 | 0.1/0.12 | 0.1/0.12 | 0.06/0.1 | 0.06/0.12 | 0.06/0.1 | 0.06/0.12 | 0.06/0.1 |
| ORGANO-METAL CATALYST STANNOUS OCTOATE | 0.28 | 0.28 | 0.28 | 0.20 | 0.20 | 0.20 | 0.20 | 0.20 |
| STABILIZER SILICONE BF 2370 | 1.2/1.8 | 1.2/1.8 | 1.2/1.8 | 1/1.6 | 1/1.6 | 1/1.6 | 1/1.6 | 1/1.6 |
| CFC 11 | — | — | — | 6 | 6 | — | — | — |
| DMC | 4.0 | 4.0 | 5.0 | — | — | — | — | — |
| DENSITY kg/m$^3$ | 20.3 | 18.3 | 17.8 | 20.1 | 18.2 | 22.7 | 21.0 | 20.6 |
| PERM. DEFORMATION 90% | 4.2 | 4.4 | 5 | 4.5 | 4.7 | 4.5 | 5 | 6 |
| LOADING CAPACITY 40% N | 100 | 120 | 110 | 100 | 100 | 130 | 130 | 135 |
| IMPRESSABILITY | NO | NO | NO | NO | NO | NO | NO | NO |
| SPLITTINGS | NO | NO | NO | NO | NO | NO | NO | NO |
| SCORCHING | NO | NO | NO | NO | NO | NO | SLIGHT | EVIDENT |

We claim:

1. A process for preparing flexible polyurethane foams having a density less than 21 kg/m3 in the presence of an expanding agent other than a chlorofluoroalkane type expanding agent, which comprises the step of reacting a) an organic polyisocyanate with b) a polyol composition consisting essentially of i) at least one polyol having an equivalent weight of between 50 and 2000 and a nominal functionality of at least 2, ii) water in a quantity equal to or greater than 3 parts by weight per 100 parts of the polyol, and iii) dimethyl carbonate (DMC), as one of the expanding agents, with the DMC water weight ratio being between 0.2 and 3.

2. A process as claimed in claim 1, wherein the reaction between the polyisocyanate and the polyol composition is conducted at ambient temperature and at an equivalents ratio of the polyisocyanate to the polyol composition of between 0.8 and 1.2.

3. A process as claimed in claim 1, wherein the polyisocyanate is a low molecular weight polyisocyanate of general formula:

OCH—R—NCO     (I)

where R represents a $C_5$–$C_{25}$ cycloaliphatic or aromatic radical, optionally substituted with alkyl groups.

4. A process as claimed in claim 1, wherein the polyisocyanate is a medium or a high molecular weight polyisocyanate obtained by phosgenation of an aniline-formaldehyde condensate of general formula:

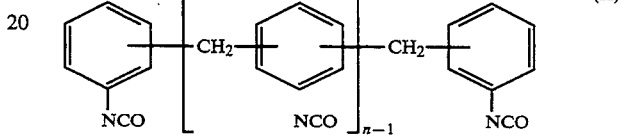

(II)

where n is a whole number greater than or equal to 1.

5. A process as claimed in claim 1, wherein the polyisocyanate is 2,4-toluenediisocyanate.

6. A process as claimed in claim 1, wherein the polyol has an equivalent weight of between 50 and 2000 and a nominal functionality of between 2 and 4 and is selected from the group consisting of polyol polyethers, polyol polyethers containing ester groups, polyol polyethers containing terminal amino groups, and polyol polyesters.

7. A process as claimed in claim 6, wherein the polyols are the polyol polyethers, polyol polyethers containing ester groups, or the polyol polyethers containing terminal amino groups, which are prepared by condensing $C_2$–$C_6$ olefinic oxides on starter compounds comprising at least two active hydrogen atoms.

8. A process as claimed in claim 1, wherein the water is in a quantity of between 3 and 6 parts by weight per 100 parts of the polyol.

9. A process as claimed in claim 5, wherein the polyisocyanate is a mixture of 2,4-toluenediisocyanate and 2,6-toluenediisocyanate present in an amount of up to 20 wt. %.

* * * * *